June 22, 1965 J. L. ANDERSON 3,191,056

SUPERCONDUCTIVE TRANSMISSION LINE CIRCUITS

Filed Dec. 30, 1960 3 Sheets-Sheet 1

INVENTOR
JOHN L. ANDERSON
BY John E. Dougherty Jr.
ATTORNEY

June 22, 1965 J. L. ANDERSON 3,191,056

SUPERCONDUCTIVE TRANSMISSION LINE CIRCUITS

Filed Dec. 30, 1960 3 Sheets-Sheet 3

United States Patent Office 3,191,056
Patented June 22, 1965

3,191,056
SUPERCONDUCTIVE TRANSMISSION LINE CIRCUITS

John L. Anderson, Poughkeepsie, N.Y., assignor to International Business Machines Corporation, New York, N.Y., a corporation of New York Filed Dec. 30, 1960, Ser. No. 79,824
12 Claims. (Cl. 307—88.5)

The present invention relates to superconductive circuits and, more particularly, to improved superconductive circuits which include one or more superconductive transmission lines.

In the majority of superconductor circuits of the prior art, switching, transfer and other memory functions are achieved by selectively introducing resistance into different ones of a plurality of current paths which are connected in parallel across a current source. The majority of these circuits have been of the wire wound type and the operating speeds obtainable with such circuits are limited by their L/R time constants. Examples of such circuits are found in an article by D. A. Buck entitled "The Cryotron—A Superconductive Computer Component" which appeared in the Proceedings of the IRE, for April 1956. Higher speeds of operation in circuits of this general type have been achieved in circuits fabricated in thin film form, examples of which are found in Patent No. 2,966,647 which issued on December 27, 1960, to J. J. Lentz. More recently, as is evidenced by Patent No. 2,962,681, issued November 29, 1960, to J. J. Lentz, superconductive circuits have been fabricated in the form of transmission lines with the gate conductors in the lines properly matched to the characteristic impedance of the lines to achieve optimum speed of operation. Further examples of superconductive transmission line circuits are shown and described in copending applications Serial No. 52,724 and Serial No. 16,431, filed respectively, in behalf of N. H. Meyers and D. R. Young et al., on August 29, 1960, and March 21, 1960, both of which applications are assigned to the assignee of the subject invention.

In accordance with the principles of the present invention, improved transmission line superconductive circuits are provided which are operable at extremely high speeds. One embodiment of such a circuit herein disclosed by way of example is a superconductive readout circuit which is in the form of a superconductive transmission line in which a number of gate conductors are connected. Each of these gate conductors is controlled between superconducting and resistive states by an adjacent control conductor. In order to determine which of the gate conductors is in a resistive state, a signal is propagated in one direction in the transmission line which produces at the resistive gate conductor a reflection which propagates back in the line in the opposite direction. The line is provided with an output cryotron having a control conductor connected in the line and a gate conductor responsive to be driven resistive when the control conductor is energized by a reflection produced as described above. The operation of this output cryotron is further controlled by a bias control conductor so that the output gate is driven resistive in response to the reflection produced in the line only when the bias control conductor is energized. The particular time at which this output gate conductor is driven into a resistive state indicates the particular gate in the line which produced the reflection to energize the output control conductor. Since the output cryotron is controlled by its bias control conductor, a number of similar output cryotrons may be included with the spacing between the output cryotrons such that by selective energization of the bias control conductors for the output cryotrons, it is possible to give different significance to the outputs produced by reflections at different gate conductors in the superconductive transmission line. In this way, column shifting in either direction, as well as increasing or decreasing the value represented by a resistive gate in the line are achieved.

Further, in accordance with the principles of the subject invention, the output produced by the transmission line described above which as disclosed, has significance in time only, is transformed into a distinct current output by employing second and third transmission lines operable in conjunction with the first transmission line in which the gate conductors which are selectively driven resistive are connected. The second transmission line receives a signal at a fixed time relative to the time at which the readout signal is applied to the first transmission line and the third transmission line receives a signal in response to the output produced by the output cryotron for the first transmission line. Each of the second and third transmission lines includes a group of control conductors through which signals in the particular line propagate in sequence and the design is such that the signals propagate in these lines to energize these control conductors at different rates. Therefore, the particular times at which the control conductors are energized in the third transmission line, which line receives its signal under control of the output control conductor for the first transmission line, are dependent upon the particular gate in the first transmission line which produces the output reflection. The output circuit includes the control conductors in the second and third transmission lines and produces a distinct current output which is controllable in accordance with the time relationship of the signals propagating in these transmission lines and, this circuit, therefore, transforms the output of the first transmission line which has meaning in time only, to a distinct current output.

Therefore, it is an object of the present invention to provide improved superconductive circuits.

It is a further object to provide superconductive readout circuits.

It is still another object to provide circuits of the above described type in the form of superconductive transmission lines.

A more specific object is to provide a superconductive circuit which provides outputs in response to reflections produced in a superconductive transmission line.

Still another object is to provide a superconductive circuit including a plurality of superconductive transmission lines and an output circuit controlled by control conductors connected in these transmission lines wherein these control conductors are energized in a sequence determined by the time at which signals are applied to the lines and the speed at which the applied signals propagate through the control conductors in the lines.

Still another object is to provide improved superconductive circuits for selectively reading out information represented by current in one or more lines in any one of a number of different forms. More specifically, it is an object of the present invention to provide a superconductive circuit in the form of a superconductive transmission line to produce outputs in response to reflections from resistive gates in the transmission line wherein each gate represents an information value and these information values may be either shifted, increased or decreased selectively during the readout operation.

Still another object is to provide a superconductive circuit for transforming outputs which have significance in time only to distinct current outputs.

The foregoing and other objects, features and advantages of the invention will be apparent from the following more particular description of preferred embodiments of the invention, as illustrated in the acompanying drawings.

Figure 1:
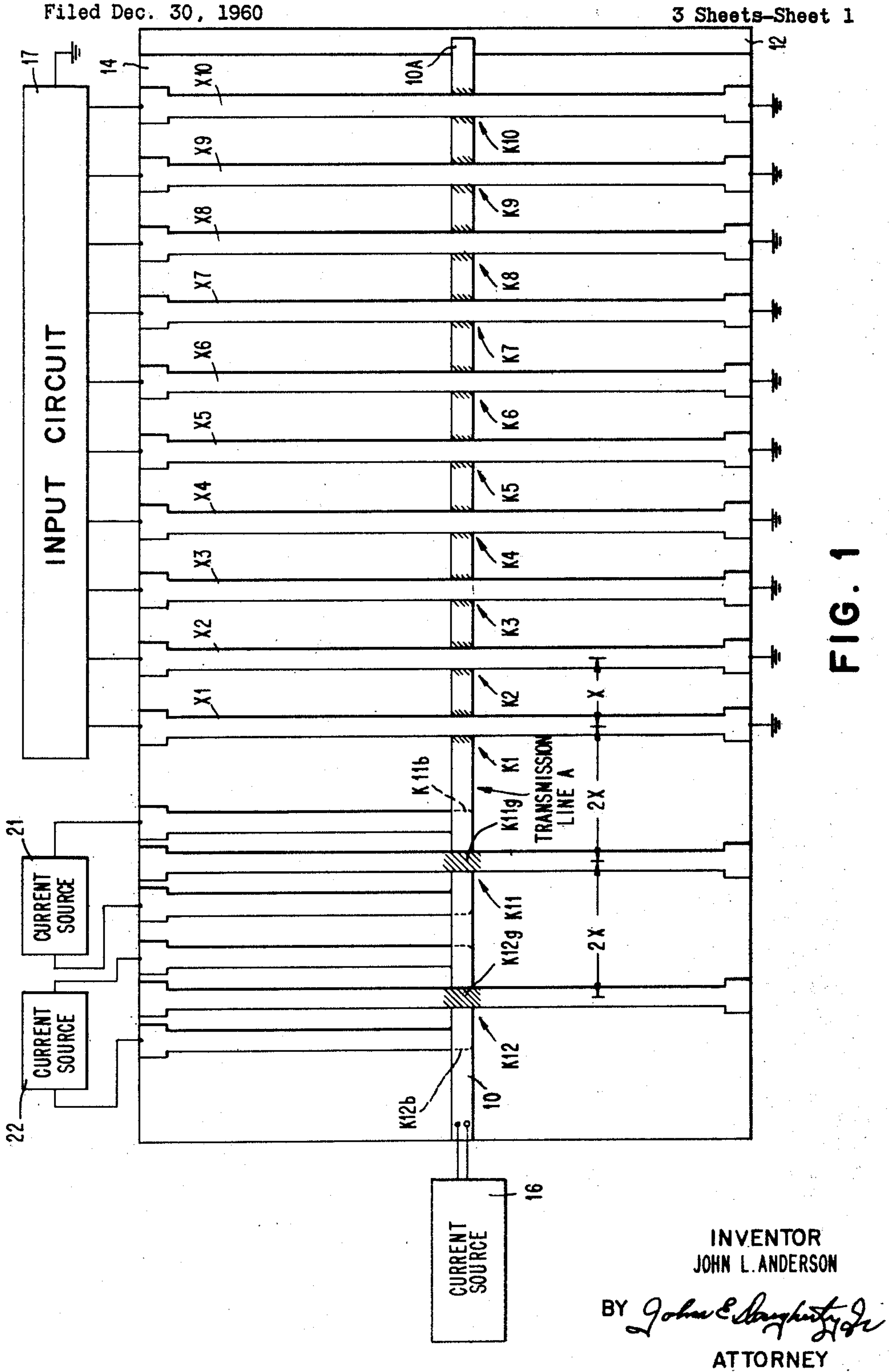
FIG. 1 is a somewhat schematic representation of a superconductive transmission line readout circuit, in accordance with the principles of the present invention.

Referring now to the drawings in detail, FIG. 1 shows a transmission line structure for reading out information stored as the presence or absence of current in a plurality of superconductive current paths designated X1 through X10. The transmission line of FIG. 1 is formed by a planar conductor 10 which is mounted on a superconductive shield 12 and separated from this shield by a layer of insulating material 14. Transmission line structures of this type are shown and described in detail in Patent No. 2,962,681 and copending application Serial No. 52,724, cited above. Signals of a predetermined duration such as to have a length on the transmission line that is short compare to the spacing between the various inputs and outputs associated with the line are applied to the line by a current source 16. Signals applied by this source to the transmission line provide an output indicating which of the ten lines X1 through X10 is carrying current. Current is selectively applied to these lines by an input circuit designated 17.

Each of the lines X1 through X10 traverses a section of strip 10 and forms with the traversed section a cryotron with the gate being the traversed section of strip 10 and the control the traversing section of the appropriate conductor X1 through X10. These ten cryotrons are designated K1 through K10. It should be noted that the control conductors formed by the portions of the lines X1 through X10 are not narrower than the gate conductors traversed thereby, as is usually the case where it is desired to achieve current gain in operation. The reason for the construction shown is that it may be desirable to operate the lines X1 through X10 themselves as transmission lines, in which case, narrow control conductors produce some reflection that is avoided with the construction shown. Gain can be achieved by providing a bias line parallel to each of the control sections of the cryotrons K1 through K10, or these cryotrons can be operated at a gain less than unity. Narrow control conductors may, of course, be employed and the lines designed to eliminate or minimize reflections and/or any undesired effects due to reflections.

The transmission line formed by strip 10 and shield 12, which line shall be hereinafter referred to as transmission line A, has a termination 10A which is designed to have an impedance equal to the characteristic impedance of transmission line A. When there is no current on any one of the lines X1 through X10 and the gates of the cryotrons K1 through K10 are therefore all superconductive, a pulse applied by generator 16 to transmission line A propagates down the line to the termination 10A without producing any reflections. However, when one of the lines, for example, line X1, is carrying current to introduce resistance into the gate section of cryotron K1, which forms a part of the strip 10 of transmission line A, a reflection is produced the magnitude of which depends upon the relationship between the resistance of the gate and the characteristic impedance of the transmission line. The reflected wave then propagates back toward the generator 16, while at the same time a portion of the incident wave continues to propagate in the other direction toward termination 10A.

The reflected portion of the wave passes through the control conductor section of an output cryotron K11 and the control conductor section of an output cryotron K12 as it propagates from right to left. Output cryotrons K11 and K12 are provided with bias control conductors K11*g* and K12*g* which receive current from current sources 21 and 22. Only one of these current sources is utilized at a time and the source utilized is not actuated during a readout operation until the trailing edge of the wave applied by current source 16 to the transmission lines has propagated from left or right past cryotron K11. Assuming cryotron K11 is to be utilized as an output cryotron, the bias conductor of this cryotron **K11*b* is then energized by current source 21, the current applied to the bias conductor being insufficient of and by itself to drive the gate section K11*g* of cryotron K11 resistive. However, when the reflected signal from the now resistive gate of cryotron K1 is propagated past gate K11*g*, the combined field of this wave propagating from right to left and the biasing signal in bias conductor K11*b* is sufficient to drive gate K11*g*** resistive. As the reflected signal continues to propagate from right to left, the gate K12*g* of cryotron K12 remains superconductive since bias line K12*b* is not energized at this time.

Figure 3A:
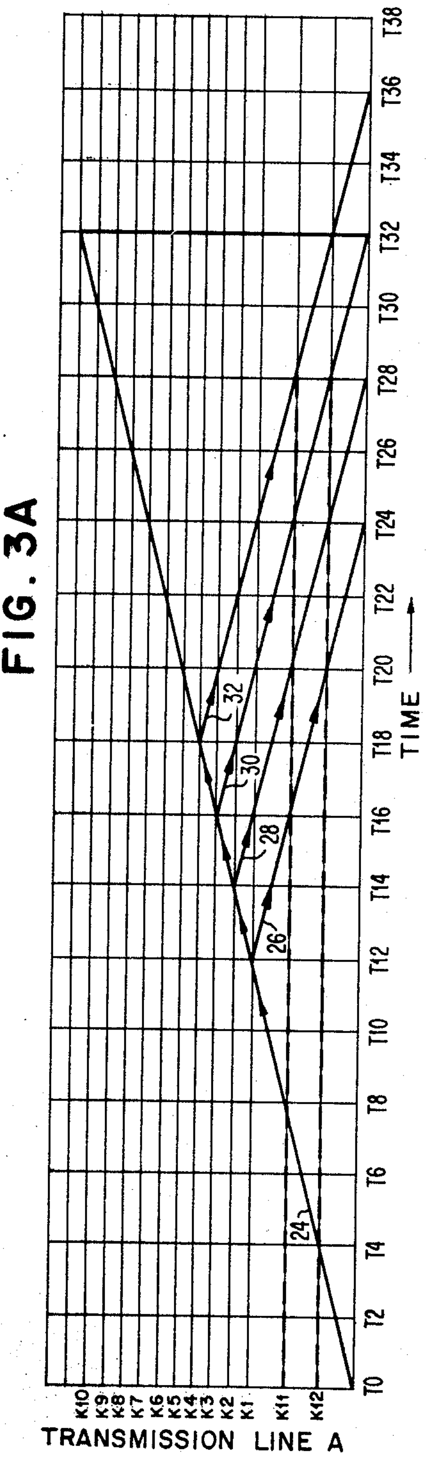
FIG. 3A is a diagram illustrating the manner in which pulses are propagated in the transmission line of FIG. 1, and also in one of the three transmission lines of FIG. 2.

The output of the circuit of FIG. 1, when operated as above described, is the resistive manifestation provided by gate K11*g* of cryotron K11. The time at which this gate is driven resistive indicates which one of the lines X1 through X10 is carrying current. FIG. 3A illustrates the time relationship for outputs provided when different ones of the conductors X1 through X4 are energized. The showing of the outputs realized for currents in these four conductors is believed to be sufficient to illustrate the manner in which current in any one of the lines X1 through X10 produces an output. In FIG. 3A, time is plotted as the abscissa and position along transmission line A as the ordinate. The straight line 24 represents the progress of a pulse applied by current source 16 to the transmission line at a time T0. This pulse as it propagates from left to right reaches cryotron K12 at a time T4, cryotron K11 at a time T8, cryotron K1 at a time T12, cryotron K2 at a time T14, etc. The straight line curves 26, 28, 30 and 32 represent the manner in which pulses are propagated, during a readout operation, when current is flowing respectively in lines X1, X2, X3 and X4. When current is flowing in line X1 and the gate of cryotron K1 is resistive, a reflection is produced in the transmission line at time T12, which reflected pulse, as illustrated by straight line curve 26, reaches the gate of cryotron K11 at time T16 and the gate of cryotron K12 at time T20. When, during a readout operation, conductor X1 is deenergized and conductor X2 is carrying current, the reflection is produced at time T14 and, as indicated by curve 28, reaches cryotrons K11 and K12 at times T20 and T24, respectively.

It is apparent from studying the figure that a reflected pulse produced at cryotron K1 due to the presence of current in conductor X1 reaches cryotron K12 at time T20 which is exactly the same time that a reflection produced by cryotron K2 reaches cryotron K11. Similarly, a pulse reflected from cryotron K3 reaches cryotron K12 at time T28 which is the same time that a pulse reflected from cryotron K4 reaches cryotron K11. Thus, it can be seen that the value of the information bit, as represented by the one of the conductors X1 through X10 which is carrying current, can be either raised or lowered by one by energizing the proper one of the current sources 22 or 21. For example, if current source 21 and gate **K11*g* are to be utilized to produce the real values as they are actually stored by currents in lines X1 through X10, current source 22 and gate K12*g* may be selectively employed to produce the outputs indicative of the stored value increased by one. It will, of course, be obvious to one skilled in the art that by adding further bias circuits and properly located output gates, the values represented by the currents in the conductors X1** through X10 can be selectively increased or decreased by one or more as they are read out.

Figure 2:
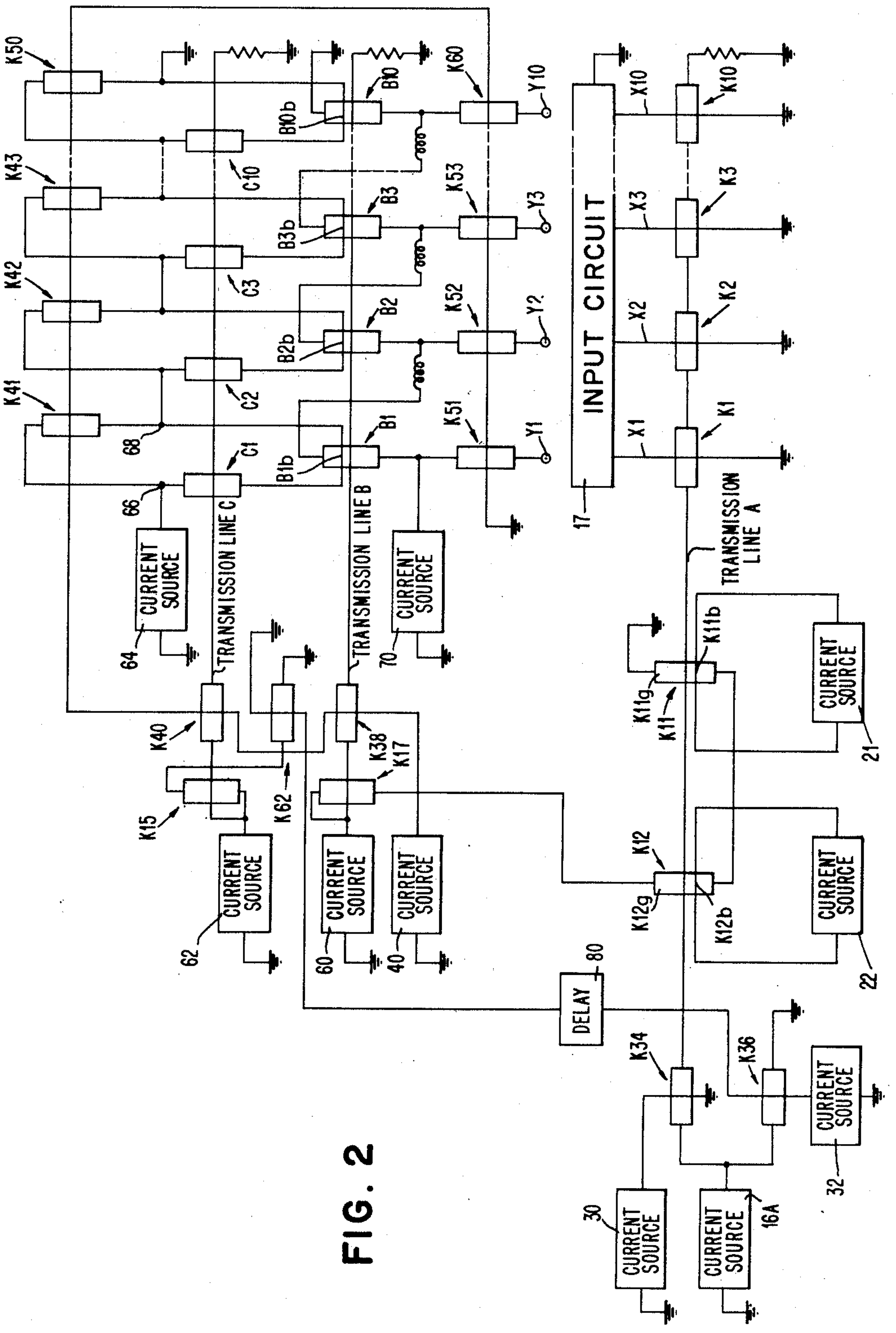
FIG. 2 is a schematic representation of a superconductive readout system including a plurality of superconductive transmission lines, one of which produces outputs having significance in time only and the others of which cooperate to transform these outputs into distinct current outputs.

The circuit of FIG. 2 shows a complete system for utilizing a number of transmission lines of the general type employed in FIG. 1 in a readout circuit which produces an output indicative of information stored in the form of a current in a predetermined one of a plurality of lines. The transmission line A in FIG. 1 is represented in FIG. 2 in the lower portion of the drawing by a single line. Each of the cryotrons in the circuit is represented by a rectangular block, which designates the gate, and one or more lines traversing the block to represent the control conductor for the gate. In order to avoid over-complicating the drawing, the section of transmission line A including cryotrons K4 through K9 has been omitted in FIG. 2. Signals are applied to transmission line A of FIG. 2 under the control of two current sources 30 and 32 which are connected respectively to the control conductors for a pair of cryotrons K34 and K36. When current source 30 is energized, the gate of cryotron K34 is driven resistive so that the current from source 16A is shunted through the gate of cryotron K36 directly to ground. When a signal is to be applied to transmission line A, the circuit is first reset in this manner and then current source 32 is energized to shift the current into the transmission line and thereby cause a pulse to be propagated down the line. Current source 32 is quickly deactuated and current source 30 is actuated to drive the gate of cryotron K34 resistive and thereby terminate the pulse applied to transmission line A so that the length of this pulse on the line is less than the spacing between the gates of cryotrons K1, K2, K3, etc. In the description to follow, assume that the information stored by the presence of current in one of the lines X1, X2, X3, etc., is to be read out as a true value by actuating bias current source 21 to apply a biasing current to control conductor K11*b* and thereby render cryotron K11 effective to produce the desired output pulse. The bias control conductor K11*b* is shown in FIG. 2 adjacent the portion of transmission line A which serves as a control conductor for cryotron K11 in order to facilitate the circuit description, it being understood that these two control conductors are actually arranged one above the other as shown in FIG. 1 to apply additive fields to the gate.

The circuit of FIG. 2 also includes two other transmission lines, also generally represented by a single line in the drawing. These transmission lines, which are designated transmission line B and transmission line C, function together with transmission line A to convert the output developed by transmission line A, which is an output having significance in time only, to a current output on one of a predetermined number of output lines. Transmission line C includes the control conductors of a latching cryotron K15 and of a plurality of cryotrons C1 through C10. When a signal is propagated along this line the gates of these cryotrons are driven resistive in sequence. The signal applied to transmission line C is either sufficient of and by itself to drive the gates of cryotrons C1 through C4 resistive, or each of these cryotrons is provided with a constant bias. In either case, each time a pulse is propagated on this line, each of these cryotrons is driven resistive in sequence.

Transmission line B includes the control conductors of a latching cryotron K17 and of a plurality of cryotrons B1 through B10. Each of the cryotrons B1 through B10 is also provided with a bias control conductor B1*b* through B10*b*. For simplicity of circuit illustration, these bias conductors are shown adjacent the control conductor sections of transmission line B, though the bias control conductors and transmission line control conductors are actually arranged one above the other in the manner illustrated in FIG. 1 for cryotrons K11 through K12. The design is such that a signal propagated along transmission line B is effective to drive the gates of cryotrons B1 through B10 resistive only when at the time the signal is propagated through the control for the gate, the corresponding one of the bias control conductors is then energized with a bias current.

The circuit of FIG. 2 is initially conditioned for operation by energizing a reset current source 40, and also current source 30. The energization of current source 30 introduces resistance into the gate of cryotron K34 to cause all of the current from source 16A to be shunted out of transmission line A. Energization of reset current source 40 introduces resistance into the gates of a number of cryotrons, specifically, cryotrons K38, K40, K41 through K50, and K51 through K60.

Reset current source 40, by driving the gate of cryotron K38 resistive, directs the current from a source 60 out of transmission line B to a shunt path to ground which includes the gate of latching cryotron K17 and the gates K11*g* and K12*g* of cryotrons K11 and K12.

Reset current source 40, by driving the gate of cryotron K40 resistive, directs the current from a current source 62 out of transmission line C and through a shunt path to ground which includes the gates of cryotrons K15 and K62.

Reset current source 40, by driving the gates of cryotrons K41 through K50 resistive, esablishes current in each of the bias conductors B1*b* through B10*b* for the cryotrons B1 through B10, which also have control conductors connected in transmission line B. These bias control conductors receive their current from a source 64 which is connected to a terminal 66 from which two parallel paths extend to a terminal 68. One of these paths includes the gate of cryotron K41 and the other includes the gate of cryotron C1, which has its control conductor connected in transmission line C, as well as the bias control conductor B1*b* for cryotron B1 which has its other control conductor connected in transmission line B. When the gate of cryotron K41 is driven resistive, current from source 64 is directed through the other parallel path including the bias control conductor B1*b*. Similarly, when the control conductors for cryotrons K42 through K50 are driven resistive, the bias current from source 64 is directed through bias control conductors B2*b* through B10*b*.

Reset current source 40, by driving the gates of cryotrons K51 through K60 resistive, resets an output circuit which receives its current from a current source 70. This output circuit includes the gates of cryotrons B1 through B10, which are connected in series circuit relationship with source 70. The gates of cryotrons K51 through K60 are connected so that each shunts a portion of this series circuit. When the gates of cryotrons K51 through K60 are driven resistive by actuating reset source 40, the current in the output circuit supplied by source 70 is directed through all of the gates of cryotrons B1 through B10 in the series circuit.

With the circuit thus reset and no current in any one of the transmission lines A, B or C, the bias current from source 64 flowing in the bias control conductors B1*b* through B10*b*, and the output current from source 70 flowing through the gates of cryotrons B1 through B10, a readout operation to provide an output indicative of which one of the lines X1 through X10 is carrying current is initiated by energizing current sources 32 and 30 in sequence to apply a pulse to transmission line A.

In order to facilitate the explanation, we shall consider a current on particular ones of the lines X1 through X10 to represent, respectively, decimal values of 1 through 9 and 0. Thus, if there is a current on line X1, this current represents a decimal value of 1, whereas a current on line X2 represents a decimal value of 2. Further, in the initial explanation of the operation of the circuit of FIG. 2 to follow, the bias current source 21 is actuated and bias current source 22 is not actuated so that the output produced by transmission line A is manifested by the gate of cryotron K11 and the true value represented by current in one of the lines X1 through X10 is actually read out.

Figure 3B:
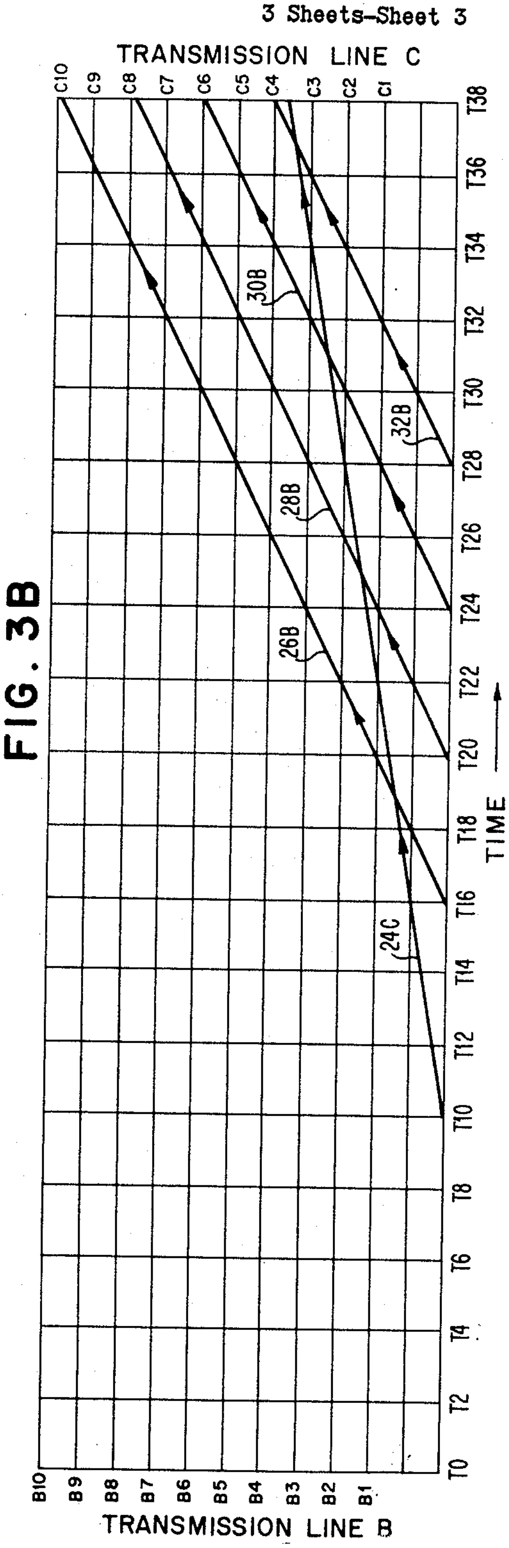
FIG. 3B is a diagram illustrating the manner in which pulses are propagated in two of the transmission lines of FIG. 2.

The time relationship in which the pulses are propagated on the various lines to produce the desired output in the circuit of FIG. 2 is illustrated in the timing diagram of FIGS. 3A and 3B. FIG. 3A has been discussed above and curve 24 of this figure illustrates the manner in which a signal is propagated along transmission line A. Curves 26, 28, 30 and 32, respectively, represent the manner in which the reflections are propagated when there is a current in lines X1, X2, X3 and X4. In the timing diagram of FIG. 3B, the abscissa is plotted as time in the same fashion as FIG. 3A. The ordinate at the left of FIG. 3B represents position along the transmission line B, which position is identified by the control conductors for cryotrons B1, B2, B3 . . . B10. The ordinate at the right of the diagram of FIG. 3B represents the position of a pulse or a wave on transmission line C, again with respect to the control conductors connected in that line designated C1, C2, C3 . . . C10. Curve 24C taken together with the ordinate at the right hand side of FIG. 3B represents the progress of a wave along the transmission line C through the control conductors C1, C2, C3, etc., connected in this line. As indicated, the wave propagation represented by 24C is begun at a time T10. Curves 26B, 28B, 30B and 32B, taken together with the ordinate as plotted at the left side of FIG. 3B, represent the manner in which waves are propagated through the control conductors for cryotrons B1, B2, B3, etc., in transmission line B, which waves are initiated at times T16, T20, T24 and T28. Referring to FIG. 3A, it can be seen that these times, T16, T20, T24 and T28, correspond to the times at which waves in transmission line A, reflected from resistive gates of cryotrons K1, K2, K3 and K4, respectively, reach the control conductor of output cryotron K11.

It is apparent from an examination of the various wave propagation curves 24 of FIG. 3A and curves 24C and 26B through 32B of FIG. 3B that the waves on the transmission lines A, B and C propagate at different rates through the elements of the cryotrons associated with the particular lines. This is accomplished by arranging the cryotron elements symmetrically in the lines as indicated in FIG. 2 and constructing the lines themselves so that waves applied to the lines propagate at different speeds. In such a case, a wave propagated in transmission line A propagates at a speed one and one half times that in transmission line C; and a wave in transmission line B propagates at a speed three times the speed of propagation in transmission line C. The manner in which superconductive transmission lines can be constructed to exhibit different speeds of propagation is described in detail in copending application Serial No. 16,431, filed March 21, 1960, in behalf of J. Swihart and D. Young and assigned to the assignee of the subject application. However, if it is desired to construct each of the transmission lines in the same manner, so that pulses are propagated in each at the same speed, the same result can be accomplished by varying the space between the cryotron elements connected in each line. In such a case, where the speed of propagation is the same in each line, the spacing between the cryotron elements in the lines is such as to achieve the propagation relative to the cryotron elements in each line which is depicted in FIGS. 3A and 3B. Thus, in transmission line C the cryotron control conductors C1, C2, C3, etc., are spaced apart by a greater distance in transmission line C than the control conductors for cryotrons B1, B2, B3, etc., in transmission line B.

The different rates at which the various cryotron elements in the transmission lines A, B and C are sequentially actuated is employed in the circuit of FIG. 2 to transform the output realizable in the transmission line A, which has significance from only a time standpoint, to a distinct current output at one of a plurality of output lines or terminals.

The readout operation is initiated by actuating current sources 32 and 30 in sequence to apply a pulse to transmission line A, this actuation taking place at time T0 in FIGS. 3A and 3B. As indicated in FIG. 3A and curve 24, this pulse in transmission line A propagates from left to right through the control conductors for cryotrons K12, K11 and K1 through K10. The length of the pulse in the line is less than the spacing between the control elements connected in the line so that the pulse operates on only one control element at a time. After this pulse has propagated from left to right through the control conductors for cryotrons K12 and K11, specifically at time T10, bias control source 21 is actuated to apply a bias current to bias control conductor **K11*b* of cryotron K11 and thereby render this cryotron effective to respond to a reflection in the line and produce an output representative, in time, of the one of the lines X1 through X10 which is carrying current. The design is such that the field of the bias control conductor is in the same direction as that produced by a reflection and opposes the field associated with the signal applied to the line. Therefore, the bias control conductor K11*b*** may be energized when the signal is applied to transmission line A.

At the same time, that is at time T10, wave propagation is initiated in transmission line B. A wave is applied to this transmission line when cryotron K62 is driven resistive. This cryotron is driven resistive as a result of the current signal being applied at time T0 by current source 32 to drive the gate of cryotron K36 resistive and thereby apply a signal to transmission line A. Current source 32 is also connected to a delay device 80, the output of which is connected to the control conductor for cryotron K62. The delay device 80 is such that this control conductor is energized to apply a signal to transmission line C at time T10. The delay provided by device 80 may be achieved by using one or more trigger circuits connected in tandem or a transmission line similar to transmission lines A, B and C. The same result may also be achieved by applying the signal from current source 32 directly to the control conductor of cryotron K62 and designing the portion of transmission line C to the left of the control conductor for cryotron C1 to be sufficiently long to provide the proper amount of delay.

It should be noted that even though cryotron K62 is allowed to become superconductive after it is driven resistive to apply a signal to transmission line C, cryotron K40 remains superconductive until the next reset operation. Further, when current is initially shifted to transmission line C, the control conductor for latching cryotron K15 is energized to drive the gate of this cryotron resistive. Thus, the signals applied to this transmission line are not in the form of pulses but rather in the form of waves which build up the current in the line to a constant value as they propagate from left to right. As indicated by curve 24C in FIG. 3B, the leading edge of the current wave in transmission line C reaches the control conductor for cryotron C1 at time T22, the control conductor for cryotron C2 at time T28, the control conductor for cryotron C3 at time T34, etc. As this current wave propagates down the transmission line C through the control conductors C1, C2, C3, etc., in sequence, the gates of these cryotrons are driven resistive and the current is shifted out of the bias control conductors **B1*b*, B2*b* and B3*b* for cryotrons B1, B2 and B3. The current is shifted out of the bias control conductor B1*b* by the resistive gate of the cryotron C1 into the other parallel paths extending between terminals 66 and 68 which include the gate of reset cryotron K41. When the gate of cryotron C1 is driven resistive, the change in current distribution in the two parallel paths between terminals 66 and 68** does not affect the current distribution in the subsequent loops which include the bias control conductors B1*b*, B2*b*, B3*b*, etc. Current is shifted out of each of these bias control conductors into the associated parallel paths in sequence as the pulse propagates through the control conductors for cryotrons C1, C2, C3, etc., in transmission line C.

Assuming a decimal value of one is stored in the lines X1 through X10 and current is thus flowing in line X1 to hold the gate of cryotron K1 resistive, a reflection is produced in transmission line A at time T12. As is indicated by curve 26 in FIG. 3A, this reflection propagates from right to left and passes through the control conductor for output cryotron K11 to drive the gate of this cryotron resistive at time T16. The current from source 60 is, at this time, being directed through this gate conductor and when the gate conductor is driven resistive a signal is applied to transmission line B which is connected across the gate conductor. This signal drives the gate of latch cryotron K17 resistive so that the signal in transmission line B builds up the current in the entire transmission line. This signal propagates from left to right in transmission line B as indicated by the straight line curves 26B of FIG. 3B, and reaches the control conductor for cryotron B1 at time T20; the control conductor for cryotron B2 at time T22; the control conductor for cryotron B3 at time T24, etc. As above explained, in relation to the operation of the transmission line C, the current is not shifted out of bias control conductor B1*b* until time T22 and, therefore, the pulse passing through the other control conductor of cryotron B1, which is connected in transmission line B, is effective to produce a magnetic field which adds to the bias field and drives the gate of cryotron B1 resistive. When this gate is driven resistive, the current from source 70 is directed through the shunt path including the gate of cryotron K51 to an output terminal Y1. This terminal is connected through further superconductive output circuitry (not shown) to a superconductive ground. The presence of current at this terminal indicates that the value stored is the decimal value one.

Since the wave on transmission line B propagates at a faster rate than the wave on transmisison line C, each of the cryotrons B2, B3, etc,, is driven resistive, the pulse on transmisison line B reaching the control conductor for each cryotron before the bias control conductor is deenergized as a result of the wave propagating in transmission line C, driving gates C2, C3, etc., resistive. This, however, has no effect on the output produced at terminal Y1 since the gates of cryotrons B1, B2, B3, etc., are connected in series and all of the current is shunted by the first resistive gate, here B1, to terminal Y1.

When, during a readout operation such as above described, the lines X1 through X10 are storing a decimal value of two with line X2 being energized to maintain the gate of cryotron K2 resistive, the operation is similar, except that the reflection is produced in transmission line A at time T14 and reaches the control conductor of output cryotron K11 at time T20 (see FIG. 3A, curve 28). A signal is then applied to transmission line B at time T20, as indicated by curve 28B in FIG. 3B and this signal on this line passes through the control conductor for cryotron B1 at time T24; the control conductor for cryotron B2 at time T26; the control conductor for cryotron B3 at time T28, etc. However, as above described and as indicated by the curve 24C, the gate of cryotron C1 is driven resistive at time T22 to shift the current out of bias control conductor B1*b* of cryotron B1. Therefore, when the signal applied in transmission line B reaches the other control conductor for this cryotron, it is ineffective to drive the gate resistive in the absence of the bias field. The gate of cryotron B1 thus remains superconductive. However, the signal on transmission line C does not reach the control conductor of cryotron C2 until time T28 and, therefore, the pulse on transmission line B1 passing through the control conductor for cryotron B2 at time T26 produces a field which adds to the then present field from bias control conductor B2*b* to drive the gate of cryotron B2 resistive. As above, each of the subsequent cryotrons B3 through B10 is driven resistive since the signal in transmission line B is propagated through the associated control elements at a faster rate than the signal in transmission line C. In such a case, the current from source 70 continues to flow through the superconductive gate of cryotron B1, and is shunted by the resistive gate of cryotron B2 through the superconductive gate of cryotron K52 to output terminal Y2, indicating an output representative of the decimal value two.

Outputs are realized representative of each of the other decimal values in the form of currents at appropriate ones of terminals Y1 through Y10 in the same manner. Wave propagation in transmission line C is always initiated at time T10 and in transmission line B is initiated at a later time, depending upon the value stored in the lines X1 through X10. The precise time at which pulse propagation is begun in transmission line B, in response to the reflection produced in transmission line A driving the gate of output cryotron K11 resistive, determines how many of the cryotrons B1 through B10 will have been deprived of their bias current before the wave propagated on transmission line B reaches them. The higher the value stored in the lines X1 through X10, the later the time at which pulse propagation is initiated in transmission line B and, therefore, the greater distance the pulse must propagate in this transmission line before it reaches a control conductor for one of the cryotrons B1 through B10, which is still being subjected to a biasing field by its associated bias control conductor.

As above mentioned, the value stored in the lines X1 through X10 need not be read out in true form, but may be read out and at the same time increased by one. This is accomplished by actuating current source 22 instead of current source 21 to thereby sense the reflection in transmission line A with the gate of cryotron K12, rather than the gate of cryotron K11. These gates are connected in series across transmission line B and each is effective when driven resistive to apply a pulse to this transmission line. The only difference in the operation is that the gate of cryotron K12 is driven resistive by a reflection at a time later than the gate of cryotron K11 and, therefore, the pulse propagation in transmission line B is initiated at a later time. As a result, the value stored by lines X1 through X10 is increased by one as read out and when, for example, line X1 is carrying current representative of a decimal value of one, this reflection is not sensed by cryotron K12 until time T20, at which time pulse propagation is initiated in transmission line B. As above described, when pulse propagation is initiated in transmission line B at time T20, the gate of cryotron B1 remains superconducting and the gate of cryotron B2 is driven resistive so that the output current from source 70 is directed to terminal Y2 representative of a decimal value of two, that is the value stored in the lines X1 through X10 is increased by one.

This type of operation may also be used for the shifting operation which is a necessary function in many computer operations. It is, of course, obvious that by placing other cryotrons, similar to the cryotrons K11 and K12, at different points in transmission line A and selectively actuating biasing current sources for these cryotrons, the values represented by the current in lines X1 through X10 may either be increased or decreased by one or more, or stated another way, the information represented by current in one of these lines may be shifted either to the right or to the left.

It should be noted that the transmission lines B and C may also be latched, so that the signals applied to these lines are not in the form of pulses but rather waves which build up the current in these lines as they propagate from left to right, by operating cryotrons K11, K12 and cryotron K62 so that they are heat latched and eliminating latching cryotrons K15 and K17. In this mode of operation, cryotrons K11, K12 and K62 are designed so that when any one of these cryotrons is driven resistive at a time when it is carrying current to apply a signal to the associated transmission line, the current remaining in the gate of the cryotron is effective to produce sufficient heat to maintain it in a resistive state after its control conductor is deenergized.

While the invention has been particularly shown and described with reference to preferred embodiments thereof, it will be understood by those skilled in the art that various changes in form and details may be made therein without departing from the spirit and scope of the invention.

What is claimed is:

1. A superconductive circuit comprising; a superconductive transmission line; first and second superconductive gate conductors connected in said transmission line; first and second control conductors each arranged adjacent a corresponding one of said gate conductors for controlling that gate conductor between superconducting and resistive states; means for applying a readout signal to said transmission line; said readout signal propagating in one direction in said line through said first and second gate conductors in sequence to produce at either of said gate conductors then in a resistive state a reflection that propagates in the opposite direction in said transmission line; an output gate conductor; an output control conductor connected in said transmission line for controlling said output gate conductor between superconducting and resistive states in response to reflections produced in said transmission line by said first and second gate conductors; a readout signal applied to said transmission line when said first gate conductor connected in said transmission line is in a resistive state producing a reflection which energizes said output control conductor at a first predetermined time after said readout signal is applied; and a readout signal applied to said transmission line when said second gate conductor connected in said transmission line is in a resistive state producing at said second gate conductor a reflection which energizes said output conductors at a second predetermined time after said readout signal is applied.

2. The circuit of claim 1 wherein said superconductive circuit includes an output circuit; said output gate conductor being connected in said output circuit for controlling said output circuit to produce a distinct current output indicative of which of said first and second gate conductors connected in said transmission line is in a resistive state.

3. The circuit of claim 2 wherein said output circuit includes another superconductive transmission line; said output gate conductor when it is driven resistive being effective to apply a signal to said another transmission line.

4. A superconductive circuit comprising; a superconductive transmission line; first and second superconductive gate conductors connected in said transmission line; first and second control conductors each arranged adjacent a corresponding one of said first and second gate conductors for controlling that gate conductor between superconducting and resistive states; means for applying a readout signal to said transmission line; said readout signal propagating in one direction in said line through said first and second gate conductors in sequence to produce at either of said gate conductors then in a resistive state a reflection that propagates in the opposite direction in said transmission line; first and second output cryotrons for said circuit each having an output control conductor and an ouptut gate conductor; the output control conductor for each of said first and second output cryotrons being connected in said transmission line and energizable by the reflection produced in said transmission line; the distance between said output control conductors for said first and second output cryotrons in said transmission line being susbtantially equal to twice the distance between the first and second gate conductors in said transmission line; whereby a readout signal applied to said transmission line when said first gate conductor connected in said transmission line is in a resistive state produces at said first gate conductor a reflection which energizes the output control conductor for said first output cryotron at a predetermined time after the readout pulse is applied, and a readout signal applied to said transmission line when said second gate conductor connected in said transmission line is in a resistive state produces at said second gate conductor a reflection which energizes the output control conductor for said second output cryotron at the same said predetermined time after said readout pulse is applied.

5. The circuit of claim 4 wherein each of said first and second output cryotrons is provided with a bias control conductor; each of said output gate conductors being responsive to be driven from a superconducting to a resistive state in response to energization of its control conductor connected in said transmission line by a reflection propagating in said transmission line only when the bias control conductor for the output cryotron is energized; and means for selectively energizing said bias control conductors.

6. The circuit of claim 4 wherein said superconductive circuit includes another transmission line; said first and second output gate conductors being each effective when driven resistive to cause a signal to be applied to said another transmission line.

7. A superconductive circuit comprising first and second superconductive transmission lines; means for applying a signal to said first transmission line; a plurality of gate conductors connected in said first transmission line; means operable to introduce resistance selectively into particular ones of said gate conductors to cause said signal as it propagates in said first transmission line in said first direction to produce a reflection which propagates back in a second direction in said first transmission line; means adjacent said first transmission line responsive to said reflection produced in said line; and further means responsive to said last named means for applying a signal to said second transmission line indicative in time of the one of said gate conductors in said first transmission line which is driven resistive to produce said reflection in said first transmission line.

8. In a superconductive circuit; first, second and third superconductive transmission lines; at least first and second gate conductors connected in said first transmission line; means for selectively introducing resistance into one of said first and second gate conductors; means for applying a signal to said first transmission line which propagates in said line and produces a reflection at the one of said gate conductors which is in a resistive state; output means adjacent a portion of said first transmission line responsive to said reflection to produce an output at a time corresponding to the one of said first and second gate conductors producing the reflection; means for applying a signal to said third transmission line at a predetermined time in relation to the time at which said signal is applied to said first transmission line; means responsive to said output means for said first transmission line for applying a signal to said second transmission line at a time corresponding to the one of said gate conductors producing said reflection in said line; an output circuit including a plurality of gate and control conductors; a first group of said plurality of control conductors being connected in sequence in said second transmission line and a second group of said plurality of control conductors being connected in sequence in said third transmission line; said signals applied to said second and third transmission lines propagating through said control conductors connected in sequence therein at different rates; whereby said output circuit produces an output indicative of the gate conductor connected in said first transmission line producing said reflection therein.

9. In a superconductive circuit; first and second superconductive transmission lines; a first cryotron control conductor connected in said first transmission line; a second cryotron control conductor connected in said second transmission line; means for applying a signal to said first transmission line and for selectively applying a signal to said second transmission line at either a first predetermined time after said signal is applied to said first transmission line or at a second predetermined time after said signal is applied to said first transmission line; the speed of propagation of said signals in said lines and the position of said first and second control conductors therein being such that when said signal is applied to said second transmission line at said first predetermined time said second control conductor in said second transmission line is energized before said first control conductor in said first transmission line; and when said signal is applied to said second transmission line at said second predetermined time said second control conductor in said second transmission line is energized after said first control conductor in said first transmission line; and an output circuit including gate conductor means arranged adjacent said first and second control conductors.

10. The circuit of claim 9 wherein said means for applying signals selectively to said second transmission line includes a third transmission line having a plurality of gate conductors connected therein, means for selectively introducing resistance into any particular one of said gate conductors, means for applying a signal to said third transmission line which propagates in said line and produces at said particular gate conductor in a resistive state a reflection in said line; and output means for said third transmission line responsive to said reflection in said third transmission line for causing a signal to be applied to said second transmission line.

11. In a superconductive circuit; first and second superconductive transmission lines; means for causing a signal to be propagated in said first transmission line; means for causing a signal to be propagated in said second transmission line; an output circuit including a plurality of gate conductors and a plurality of control conductors arranged adjacent said gate conductors; a first group of said control conductors being connected in said first transmission line; a second group of said control conductors being connected in said second transmission line; said signals propagating through said control conductors at a different rate in each of said lines; whereby said output circuit responds to produce an output indicative of the time relationship of the signals propagating in said first and second transmission lines.

12. The circuit of claim 11 wherein said means for applying signals to said second transmission line includes a third superconductive transmission line, a further cryotron control conductor connected in said third transmission line and a further cryotron gate conductor adjacent said further control conductor and controllable thereby between superconducting and resistive states.

References Cited by the Examiner

UNITED STATES PATENTS

| | | | |
|---|---|---|---|
| 2,866,842 | 12/58 | Matthias | 333—99 |
| 2,966,647 | 12/60 | Lentz | 338—32 |
| 3,020,489 | 2/62 | Walker et al. | 307—88.5 |

ARTHUR GAUSS, *Primary Examiner.*

MARCUS U. LYONS, *Examiner.*